United States Patent
Lee et al.

(10) Patent No.: US 10,677,755 B2
(45) Date of Patent: Jun. 9, 2020

(54) APPARATUS AND METHOD FOR DETECTING INNER DEFECTS OF STEEL PLATE

(71) Applicant: POSCO, Pohang-si, Gyeongsangbuk-do (KR)

(72) Inventors: Ju-Seung Lee, Pohang-si (KR); Sang-Woo Choi, Pohang-si (KR); Se-Ho Choi, Pohang-si (KR); Jong-Pil Yun, Pohang-si (KR); Ho-Moon Bae, Pohang-si (KR)

(73) Assignee: POSCO, Pohang-si, Gyeongsangbuk-Do (KR)

( * ) Notice: Subject to any disclaimer, the term of this patent is extended or adjusted under 35 U.S.C. 154(b) by 0 days.

(21) Appl. No.: 14/652,086

(22) PCT Filed: Dec. 23, 2013

(86) PCT No.: PCT/KR2013/011993
§ 371 (c)(1),
(2) Date: Jun. 12, 2015

(87) PCT Pub. No.: WO2014/104675
PCT Pub. Date: Jul. 3, 2014

(65) Prior Publication Data
US 2015/0316508 A1    Nov. 5, 2015

(30) Foreign Application Priority Data

Dec. 27, 2012  (KR) .......................... 10-2012-0154251

(51) Int. Cl.
*G01N 27/82*  (2006.01)
*G01N 27/83*  (2006.01)
*B21B 38/00*  (2006.01)

(52) U.S. Cl.
CPC ............. *G01N 27/82* (2013.01); *B21B 38/00* (2013.01); *G01N 27/83* (2013.01)

(58) Field of Classification Search
CPC .... G01N 27/82; G01N 27/90; G01N 27/9006; G01N 27/9013; G01N 27/902;
(Continued)

(56) References Cited

U.S. PATENT DOCUMENTS 4,146,837 A * 3/1979 Bashkirov ............ G01N 27/904
324/225
4,602,212 A * 7/1986 Hiroshima ......... G01N 27/9046
324/227
(Continued)

FOREIGN PATENT DOCUMENTS

CN    1067510 A    12/1992
CN    1373852 A    10/2002
(Continued)

OTHER PUBLICATIONS

Extended European Search Report dated Nov. 12, 2015 issued in European Patent Application No. 13866752.2.
(Continued)

*Primary Examiner* — David M Schindler
(74) *Attorney, Agent, or Firm* — Morgan, Lewis & Bockius LLP

(57) ABSTRACT

An apparatus for detecting inner defects of a steel plate comprises an all-defect detection unit for detecting all defects including surface defects present on the surface of the steel plate and inner defects present inside the steel plate by intensity of leakage flux, measured by generating magnetic flux in a strike direction of the steel plate; a surface defect detection unit for detecting surface defects by intensity of leakage flux, measured by generating magnetic flux in the thickness direction of the steel plate, for a predeter-
(Continued)

mined detection region including all the defects detected by the all-defect detection unit; and a data processing unit for detecting only inner defects present in a detection region by excluding the detected surface defects from all the defects detected by the all-defect detection unit, for the detection region, thereby detecting only the inner defects of the steel plate.

5 Claims, 5 Drawing Sheets

(58) Field of Classification Search
CPC ........... G01N 27/9026; G01N 27/9033; G01N 27/904; G01N 27/9046; B21B 38/00
See application file for complete search history.

(56) References Cited

U.S. PATENT DOCUMENTS

| | | | |
|---|---|---|---|
| 5,485,082 A * | 1/1996 | Wisspeintner | G01B 11/0691 324/202 |
| 5,512,821 A | 4/1996 | Ando et al. | |
| 5,659,248 A * | 8/1997 | Hedengren | G01N 27/9013 324/232 |
| 6,285,183 B1 * | 9/2001 | Collingwood | G01B 7/10 324/202 |
| 2002/0105324 A1 * | 8/2002 | Kwun | G01N 29/11 324/240 |
| 2002/0121896 A1 | 9/2002 | Kato et al. | |
| 2003/0025497 A1 * | 2/2003 | Collingwood | G01B 7/28 324/242 |
| 2009/0302835 A1 * | 12/2009 | Sun | G01N 27/82 324/240 |
| 2011/0037461 A1 * | 2/2011 | Braun | G01N 27/87 324/240 |
| 2014/0055130 A1 * | 2/2014 | Nakamura | G01N 27/9046 324/240 |
| 2014/0347041 A1 | 11/2014 | Lee et al. | |

FOREIGN PATENT DOCUMENTS

| | | |
|---|---|---|
| EP | 2264446 A1 | 12/2010 |
| JP | 62-226054 A | 10/1987 |
| JP | 63-221239 A | 9/1988 |
| JP | 07-063699 A | 3/1995 |
| JP | 2001-194344 A | 7/2001 |
| JP | 2003-322622 A | 11/2003 |
| JP | 2004-037216 A | 2/2004 |
| JP | 2008-151744 A | 7/2008 |
| JP | 04-279856 B2 | 6/2009 |
| JP | 2012-159437 A | 8/2012 |
| KR | 10-2002-0060681 A | 7/2001 |
| KR | 10-2010-0076838 A | 7/2010 |
| KR | 10-2011-0025282 A | 3/2011 |
| KR | 10-2013-0068295 A | 6/2013 |

OTHER PUBLICATIONS

International Search Report issued in International Application No. PCT/KR2013/011993 dated Mar. 11, 2014, with English Translation.
Japanese Office Action dated Apr. 5, 2016 issued in Japanese Patent Application No. 2015-550306 (English translation).
Chinese Office Action dated May 3, 2017 issued in Chinese Patent Application No. 201380068387.8 (with English translation).

* cited by examiner

【Figure 1】
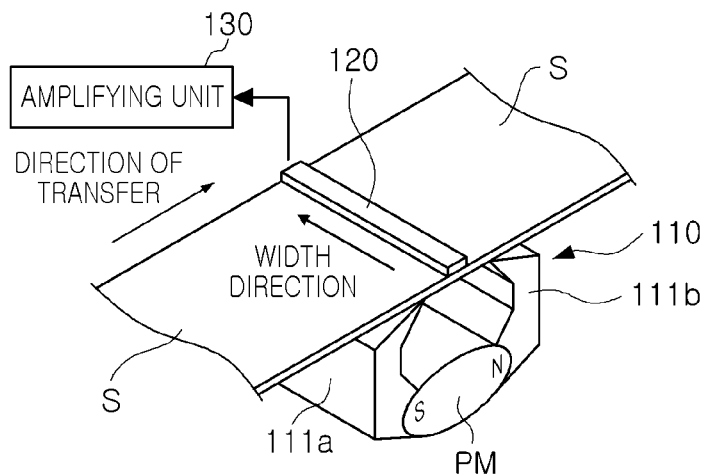
【Figure 2】
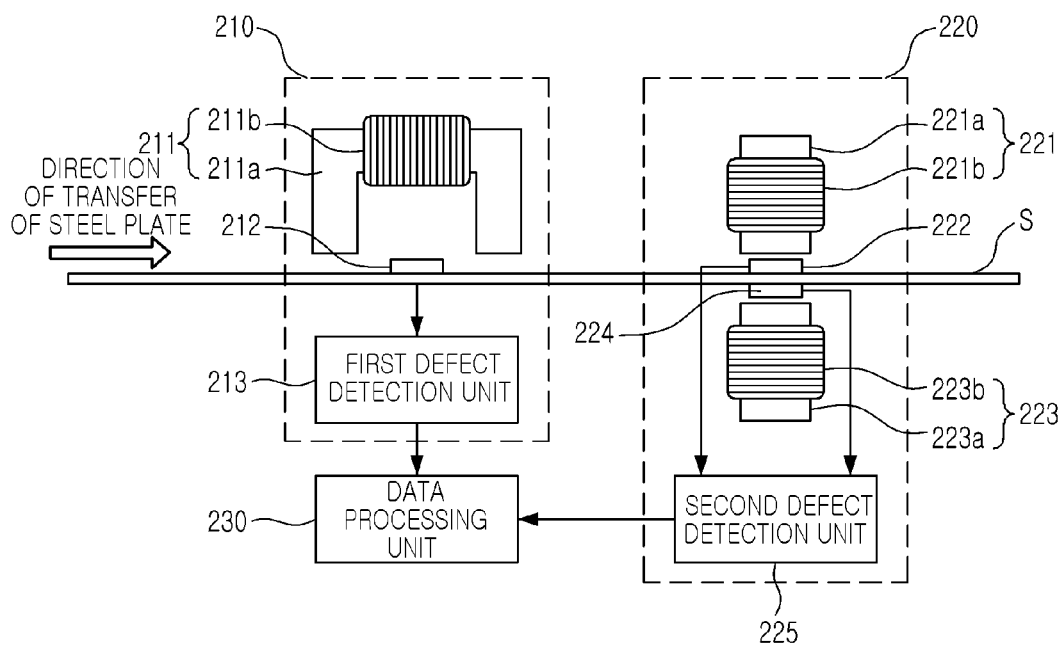

[Figure 3]
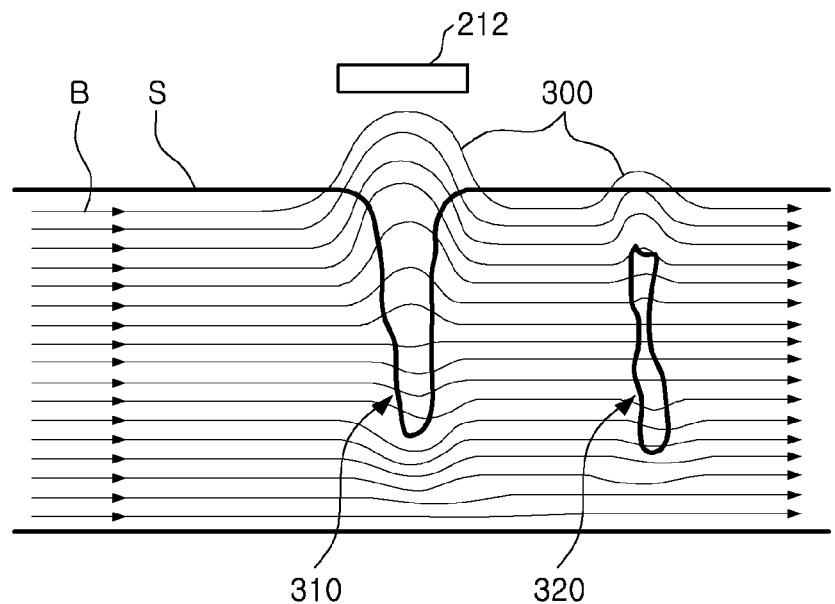
[Figure 4]
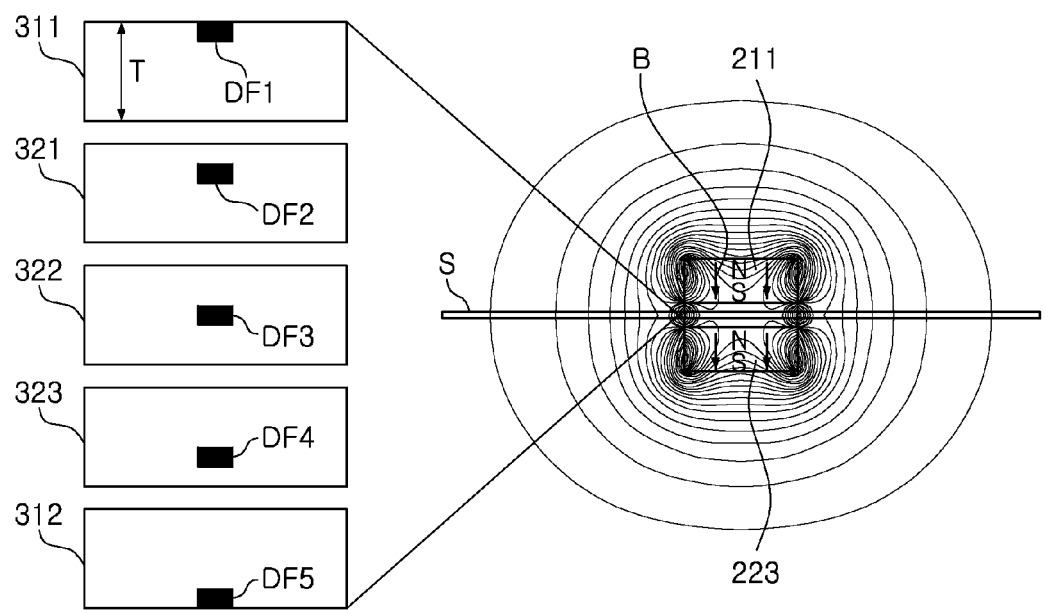

【Figure 5】
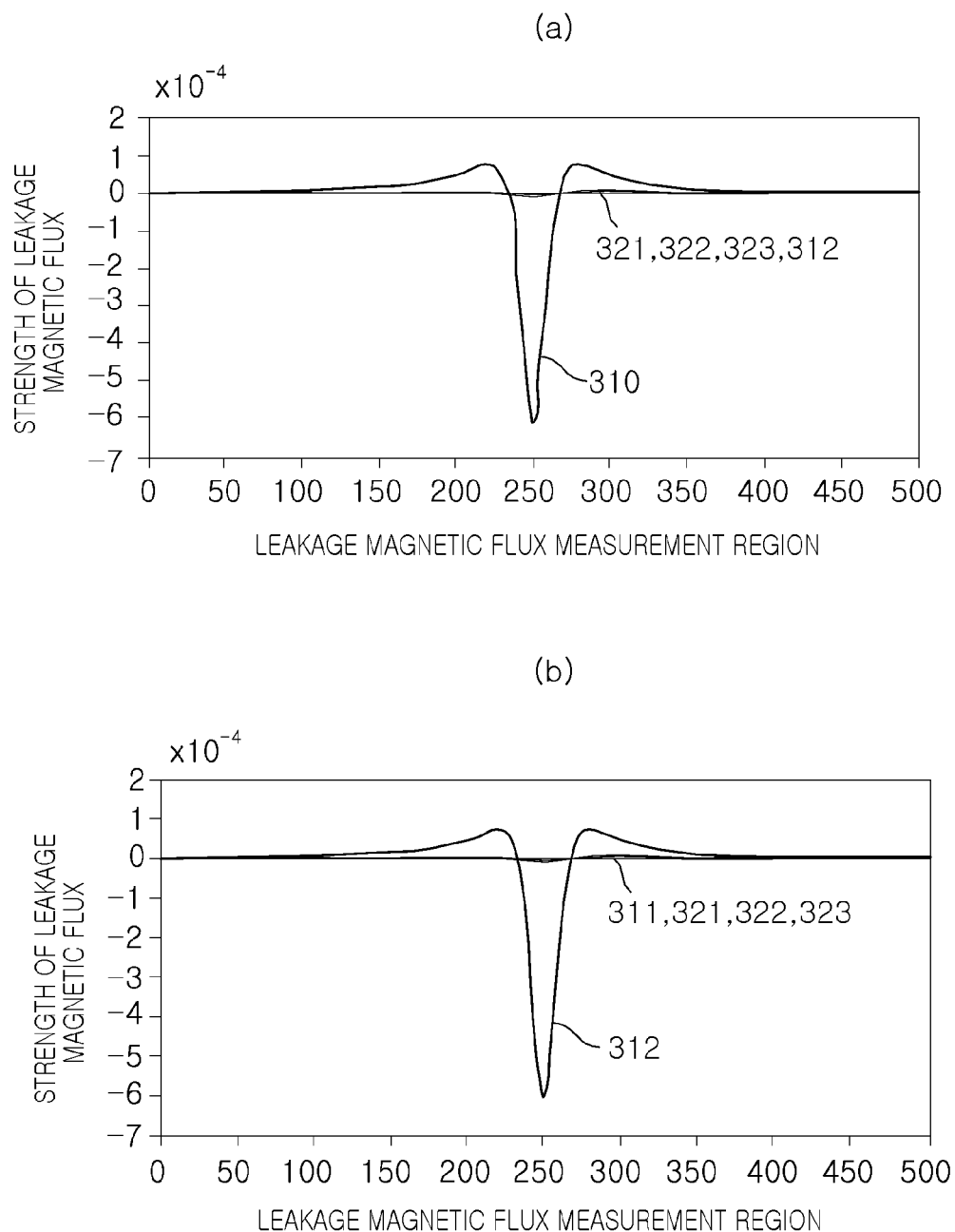

【Figure 6】
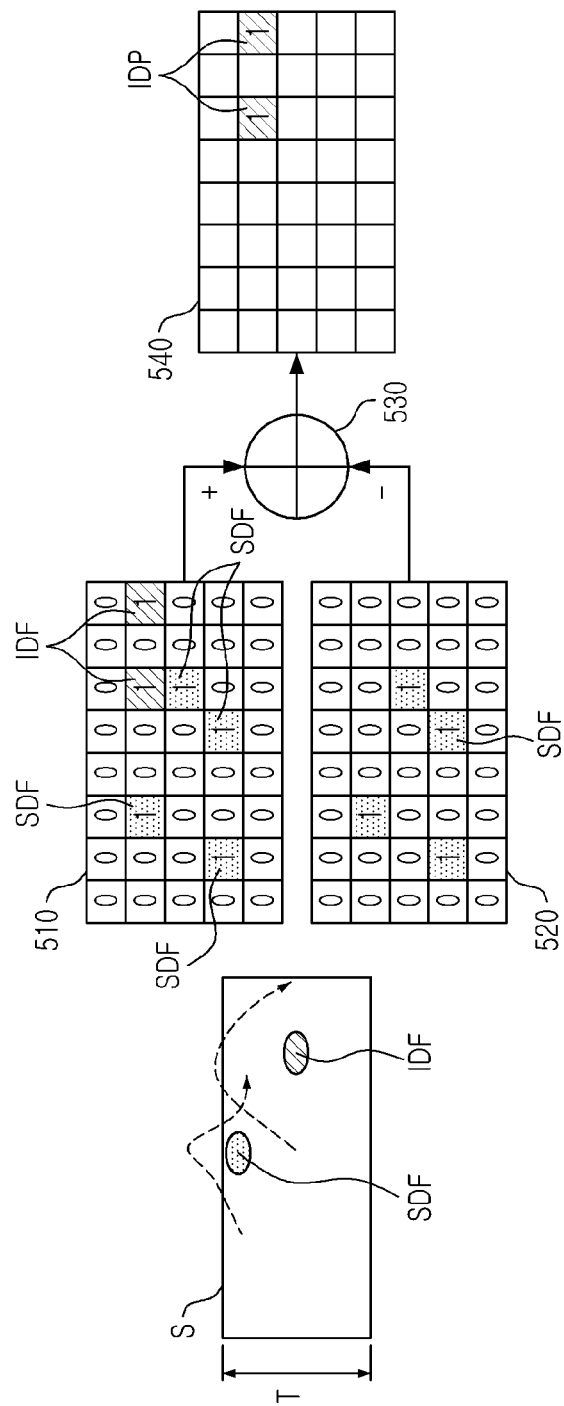

【Figure 7】
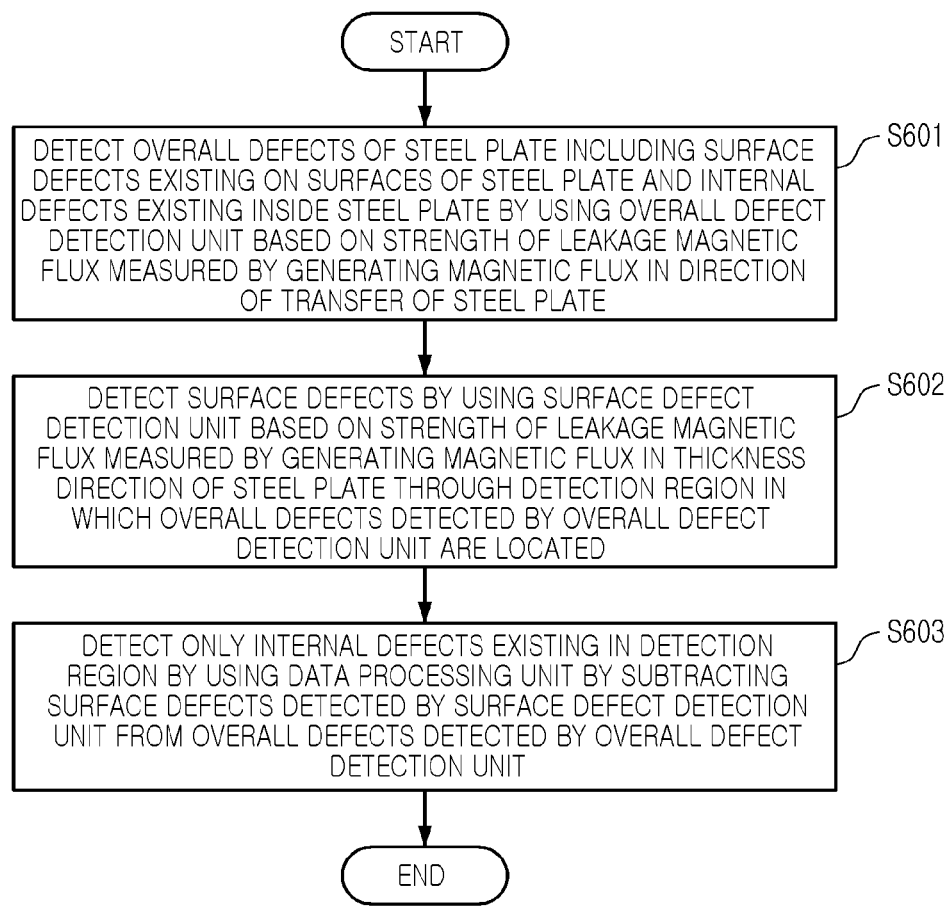

APPARATUS AND METHOD FOR DETECTING INNER DEFECTS OF STEEL PLATE

RELATED APPLICATIONS

This application is a national phase of International Application No. PCT/KR2013/011993, filed on Dec. 23, 2013, which in turn claims the benefit of Korean Application No. 10-2012-0154251, filed on Dec. 27, 2012 the disclosures of which Applications are incorporated by reference herein.

TECHNICAL FIELD

The present disclosure relates to a method for detecting internal defects of a steel plate.

BACKGROUND ART

Examples of steel defect detection techniques include an ultrasonic testing method, a magnetic flux leakage inspection method, a magnetic particle inspection method, an eddy current inspection method, and an optical method.

In the magnetic flux leakage inspection method, magnetic flux leakage from surfaces of a steel plate is measured using a magnetic sensor such as a Hall element capable of converting magnetic flux into an electric signal, and it is determined whether the steel plate has defects based on the measured magnetic flux leakage.

FIG. 1 illustrates an apparatus for detecting defects of a steel plate by the magnetic flux leakage inspection method.

Referring to FIG. 1, the steel plate defect detection apparatus may include: a magnetizing unit 110 generating magnetic flux in a direction of transfer of a steel plate S to magnetize the steel plate S; a magnetic sensor array 120 arranged along the width of the steel plate S for measuring leakage magnetic flux when magnetic flux passes through defects of the steel plate S; and an amplifying unit 130 amplifying a signal output from the magnetic sensor array 120 according to leakage magnetic flux. The magnetizing unit 110 may include a permanent magnet PM and yokes 111a and 111b extending from both sides of the permanent magnet PM.

However, when defects of the steel sheet S are detected using the steel plate defect detection apparatus, since the steel plate S is magnetized in a direction of transfer of the steel plate S, leakage magnetic flux measured using the magnetic sensor array 120 contains information about defects existing on the surfaces of the steel plate S as well as defects existing inside the steel plate S. That is, it is difficult or impossible to detect only defects existing inside the steel plate S.

DISCLOSURE

Technical Problem

Aspects of the present disclosure may provide an apparatus and method for detecting only internal defects of a steel plate.

Technical Solution

According to an aspect of the present disclosure, an apparatus for detecting internal defects of a steel plate may include: an overall defect detection unit detecting overall defects of a steel plate including surface defects existing on surfaces of the steel plate and internal defects existing inside the steel plate based on a degree of strength of leakage magnetic flux measured by generating magnetic flux in a direction of transfer of the steel plate; a surface defect detection unit detecting the surface defects based on a degree of strength of leakage magnetic flux measured by generating magnetic flux in a thickness direction of the steel plate through a detection region in which the overall defects detected by the overall defect detection unit are located; and a data processing unit detecting only the internal defects existing in the detection region by subtracting the surface defects detected by the surface defect detection unit from the overall defects detected by the overall defect detection unit.

In some embodiments of the present disclosure, the overall defect detection unit may include: a first magnetizing unit generating magnetic flux in the direction of transfer of the steel plate; a first leakage magnetic flux measurement unit measuring a degree of strength of leakage magnetic flux when the magnetic flux generated in the direction of transfer passes through the steel plate; and a first defect detection unit detecting the overall defects based on the measured degree of strength of leakage magnetic flux.

In some embodiments of the present disclosure, the surface defect detection unit may include: a second magnetizing unit generating magnetic flux in the thickness direction of the steel plate; a second leakage magnetic flux measurement unit measuring a degree of strength of leakage magnetic flux when the magnetic flux generated in the thickness direction passes through the steel plate; and a second defect detection unit detecting the surface defects of the steel plate based on the measured degree of strength of leakage magnetic flux.

In some embodiments of the present disclosure, the second magnetizing unit may include: an upper magnetizing unit disposed above the steel plate to generate magnetic flux in the thickness direction of the steel plate; and a lower magnetizing unit disposed below the steel plate to generate magnetic flux in the thickness direction of the steel plate, wherein the second leakage magnetic flux measurement unit may include: an upper leakage magnetic flux measurement unit measuring a degree of strength of leakage magnetic flux when the magnetic flux generated by the upper magnetizing unit passes through the steel plate; and a lower leakage magnetic flux measurement unit measuring a degree of strength of leakage magnetic flux when the magnetic flux generated by the lower magnetizing unit passes through the steel plate.

In some embodiments of the present disclosure, the first defect detection unit may provide first defect data about positions of the overall defects detected in the detection region, the second defect detection unit may provide second defect data about positions of the surface defects detected in the detection region, and the data processing unit may detect only the internal defects existing in the detection region by subtracting the second defect data from the first defect data.

In some embodiments of the present disclosure, the first defect data may express points of the detection region at which the overall defects are preset by using a binary number "1," and points of the detection region at which the overall defects are not present by using a binary number "0," and the second defect data may express points of the detection region at which the surface defects are present by using a binary number "1," and points of the detection region at which the surface defects are not present by using a binary number "0."

In some embodiments of the present disclosure, each of the first and second leakage magnetic flux measurement units may include: a first magnetic sensor array including a plurality of magnetic sensors arranged in a width direction of the steel plate so as to measure a degree of strength of leakage magnetic flux; a second magnetic sensor array including a plurality of magnetic sensors separate from the first magnet sensor array by a predetermined distance in the direction of transfer of the steel plate so as to measure a degree of strength of leakage magnetic flux; and a differential amplifier amplifying a difference between the degree of strength of leakage magnetic flux measured by the first magnetic sensor array and the degree of strength of leakage magnetic flux measured by the second magnetic sensor array.

In some embodiments of the present disclosure, the first and second leakage magnetic flux measurement units may include at least one selected from a Hall sensor, a magneto resistive (MR) sensor, a giant magneto resistive (GMR) sensor, and a giant magneto impedance (GMI) sensor.

According to another aspect of the present disclosure, a method for detecting internal defects of a steel plate may include: detecting overall defects of a steel plate including surface defects existing on surfaces of the steel plate and internal defects existing inside the steel plate by using an overall defect detection unit based on a degree of strength of leakage magnetic flux measured by generating magnetic flux in a direction of transfer of the steel plate; detecting the surface defects by using a surface defect detection unit based on a degree of strength of leakage magnetic flux measured by generating magnetic flux in a thickness direction of the steel plate through a detection region in which the overall defects detected by the overall defect detection unit are located; and detecting only the internal defects existing in the detection region by using a data processing unit by subtracting the surface defects detected by the surface defect detection unit from the overall defects detected by the overall defect detection unit.

In some embodiments of the present disclosure, the detecting of the overall defects may include: generating magnetic flux in the direction of transfer of the steel plate by using a first magnetizing unit; measuring a degree of strength of leakage magnetic flux by using a first leakage magnetic flux measurement unit when the magnetic flux generated in the direction of transfer passes through the steel plate; and detecting the overall defects by using a first defect detection unit based on the measured degree of strength of leakage magnetic flux.

In some embodiments of the present disclosure, the detecting of the surface defect may include: generating magnetic flux in the thickness direction of the steel plate by using a second magnetizing unit; measuring a degree of strength of leakage magnetic flux by using a second leakage magnetic flux measurement unit when the magnetic flux generated in the thickness direction passes through the steel plate; and detecting the surface defects of the steel plate by using a second defect detection unit based on the measured degree of strength of leakage magnetic flux.

In some embodiments of the present disclosure, the generating of the magnetic flux in the thickness direction of the steel plate may include: generating magnetic flux in the thickness direction of the steel plate by using an upper magnetizing unit of the second magnetizing unit; and generating magnetic flux in the thickness direction of the steel plate by using a lower magnetizing unit of the second magnetizing unit, wherein the measuring of the degree of strength of leakage magnetic flux by using the second leakage magnetic flux measurement unit may include: measuring a degree of strength of leakage magnetic flux by using an upper leakage magnetic flux measurement unit of the second leakage magnetic flux measurement unit when the magnetic flux generated by the upper magnetizing unit passes through the steel plate; and measuring a degree of strength of leakage magnetic flux by using a lower leakage magnetic flux measurement unit of the second leakage magnetic flux measurement unit when the magnetic flux generated by the lower magnetizing unit passes through the steel plate.

In some embodiments of the present disclosure, the method may further include: providing first defect data regarding positions of the overall defects detected in the detection region by using the first defect detection unit; and providing second defect data about positions of the surface defects detected in the detection region by using the second defect detection unit, wherein the detecting of only the internal defects existing in the detection region may be performed by subtracting the second defect data from the first defect data using the data processing unit.

In some embodiments of the present disclosure, the first defect data may express points of the detection region at which the overall defects are preset by using a binary number "1," and points of the detection region at which the overall defects are not present by using a binary number "0," and the second defect data may express points of the detection region at which the surface defects are present by using a binary number "1," and points of the detection region at which the surface defects are not present by using a binary number "0."

In some embodiments of the present disclosure, each of the first and second leakage magnetic flux measurement units may include: a first magnetic sensor array including a plurality of magnetic sensors arranged in a width direction of the steel plate so as to measure a degree of strength of leakage magnetic flux; a second magnetic sensor array including a plurality of magnetic sensors separate from the first magnet sensor array by a predetermined distance in the direction of transfer of the steel plate so as to measure a degree of strength of leakage magnetic flux; and a differential amplifier amplifying a difference between the degree of strength of leakage magnetic flux measured by the first magnetic sensor array and the degree of strength of leakage magnetic flux measured by the second magnetic sensor array.

In some embodiments of the present disclosure, the first and second leakage magnetic flux measurement units may include at least one selected from a Hall sensor, a magneto resistive (MR) sensor, a giant magneto resistive (GMR) sensor, and a giant magneto impedance (GMI) sensor.

Advantageous Effects

According to exemplary embodiments of the present disclosure, overall defects including surface defects and internal defects are first detected from a predetermined detection region of a steel plate, and then the surface defects are independently detected from the detection region of the steel plate. Thereafter, only the internal defects existing in the detection region may be detected by subtracting the independently detected surface defects from the overall defects.

DESCRIPTION OF DRAWINGS

FIG. 1 is a view illustrating an apparatus for detecting defects of a steel plate.

FIG. 2 is a view illustrating an apparatus for detecting internal defects of a steel plate according to an exemplary embodiment of the present disclosure.

FIG. 3 is a view illustrating a magnetizing direction of an overall defect detection unit illustrated in FIG. 2 and overall defects detected by the overall defect detection unit.

FIG. 4 is a view illustrating the positions of defects detected in a thickness direction of a steel plate by a surface defect detection unit illustrated in FIG. 2.

FIG. 5 is a view illustrating the strength of magnetic flux with respect to the positions of the defects illustrated in FIG. 4.

FIG. 6 is a view illustrating how a data processing unit illustrated in FIG. 2 detects only internal defects.

FIG. 7 is a flowchart illustrating a method for detecting internal defects of a steel plate according to an exemplary embodiment of the present disclosure.

BEST MODE

Hereinafter, exemplary embodiments of the present disclosure will be described in detail with reference to the accompanying drawings. However, various changes in form and details may be made within the scope of the present invention, and the scope of the present invention is not limited to the exemplary embodiments described below. In the drawings, the shapes and dimensions of elements may be exaggerated for clarity, and like reference numerals denote like elements.

FIG. 2 is a view illustrating an apparatus for detecting internal defects of a steel plate according to an exemplary embodiment of the present disclosure. FIG. 3 is a view illustrating a magnetizing direction of an overall defect detection unit 210 illustrated in FIG. 2 and overall defects detected by the overall defect detection unit 210, FIG. 4 is a view illustrating the positions of defects detected in a thickness direction of a steel plate by a surface defect detection unit 220 illustrated in FIG. 2, and FIG. 5 is a views illustrating the strength of magnetic flux with respect to the positions of the defects illustrated in FIG. 4. FIG. 6 is a view illustrating how a data processing unit 230 illustrated in FIG. 2 detects only internal defects.

As illustrated in FIG. 2, the apparatus for detecting internal defects of a steel plate may include: the overall defect detection unit 210 detecting overall defects including surface defects existing on the surfaces of a steel plate S and internal defects existing inside the steel plate S based on the strength of leakage magnetic flux measured by generating magnetic flux in a direction of transfer of the steel plate S; the surface defect detection unit 220 detecting the surface defects based on the strength of leakage magnetic flux measured by generating magnetic flux in a thickness direction of the steel plate S through a detection region in which the overall defects detected by the overall defect detection unit 210 are located; and the data processing unit 230 detecting only the internal defects existing in the detection region by subtracting the surface defects detected by the surface defect detection unit 220 from the overall defects detected by the overall defect detection unit 210.

Hereinafter, the apparatus for detecting defects of a steel plate will be described in detail with reference to FIGS. 2 to 6 according to the exemplary embodiment of the present disclosure.

Referring to FIG. 2, the overall defect detection unit 210 may detect overall defects including surface defects of a the steel plate S and internal defects of the steel plate S based on the strength of leakage magnetic flux measured by generating magnetic flux in a direction of transfer of the steel plate S.

In detail, the overall defect detection unit 210 may include a first magnetizing unit 211, a first leakage magnetic flux measurement unit 212, and a first defect detection unit 213.

The first magnetizing unit 211 of the overall defect detection unit 210 may generate magnetic flux B in the direction of transfer of the steel plate S as shown in FIG. 3. An electromagnet including a core 211a and a coil 211b wound around the core 211a is illustrated as an example of the first magnetizing unit 211. However, the first magnetizing unit 211 is not limited thereto. For example, it will be apparent to those of ordinary skill in the art that a permanent magnet may be used as the first magnetizing unit 211.

When magnetic flux B generated in the direction of transfer of the steel plate S passes through the steel plate S, the first leakage magnetic flux measurement unit 212 of the overall defect detection unit 210 may measure the strength of leakage magnetic flux. That is, as shown in FIG. 3, when magnetic flux B is generated in the direction of transfer of the steel plate S, the first leakage magnetic flux measurement unit 212 may measure the strength of leakage magnetic flux 300 caused by a surface defect 310 and an internal defect 320. The measured strength of the leakage magnetic flux 300 may be transmitted to the first defect detection unit 213.

The first defect detection unit 213 of the overall defect detection unit 210 may detect overall defects including the surface defect 310 and the internal defect 320 based on the strength of the measured leakage magnetic flux 300. For example, if the strength of the measured leakage magnetic flux 300 is greater than a certain value, the first defect detection unit 213 may determine that the steel plate S has an internal defect or a surface defect.

In addition, the first defect detection unit 213 may provide first defect data about the positions of the overall defects in a detection region.

That is, as shown in FIG. 6, the first defect detection unit 213 may generate first defect data about the positions of overall defects IDF and SDF in a detection region 510 and may transmit the first defect data to the data processing unit 230. In the first defect data, points of the detection region 510 at which the overall defects IDF or SDF are present may be expressed using a binary number "1," and points of the detection region 510 at which the overall defects IDF and SDF are not present may be expressed using a binary number "0."

The surface defect detection unit 220 may detect surface defects based on the strength of leakage magnetic flux measured by generating magnetic flux in the thickness direction of the steel plate S through a detection region in which the overall defects detected by the overall defect detection unit 210 are located.

In detail, the surface defect detection unit 220 may include second magnetizing units 221 and 223, second leakage magnetic flux measurement units 222 and 224, and a second defect detection unit 225.

The second magnetizing units 221 and 223 of the surface defect detection unit 220 may generate magnetic flux B in the thickness direction of the steel plate S as shown in FIG. 4. Electromagnets including cores 221a and 223a and coils 221b and 223b wound around the core 211a are illustrated as examples of the second magnetizing units 221 and 223. However, the second magnetizing units 221 and 223 are not limited thereto. For example, it will be apparent to those of ordinary skill in the art that permanent magnets may be used as the second magnetizing units 221 and 223.

The second magnetizing units 221 and 223 may include: an upper magnetizing unit 221 disposed above the steel plate S to generate magnetic flux in the thickness direction of the steel plate S; and a lower magnetizing unit 223 disposed below the steel plate S to generate magnetic flux in the thickness direction of the steel plate S.

When magnetic flux B generated in the thickness direction of the steel plate S passes through the steel plate S, the second leakage magnetic flux measurement units 222 and 224 of the surface defect detection unit 220 may measure the strength of leakage magnetic flux.

The second leakage magnetic flux measurement units 222 and 224 may include: an upper leakage magnetic flux measurement unit 222 configured to measure the strength of leakage magnetic flux when magnetic flux generated by the upper magnetizing unit 221 passes through the steel plate S; and a lower leakage magnetic flux measurement unit 224 configured to measure the strength of leakage magnetic flux when magnetic flux generated by the lower magnetizing unit 223 passes through the steel plate S.

That is, according to the exemplary embodiment of the present disclosure, the second magnetizing units 221 and 223 may generate magnetic flux in the thickness direction of the steel plate S, that is, in a direction perpendicular to the steel plate S, and the second leakage magnetic flux measurement units 222 and 224 may measure the strength of leakage magnetic flux when the magnetic flux generated in the thickness direction of the steel plate S passes through the steel plate S. If magnetic flux is generated in a direction (thickness direction) perpendicular to the plane of the steel plate S, the strength of leakage magnetic flux caused by surface defects of the steel plate S is higher than the strength of leakage magnetic flux caused by internal defects of the steel plate S, and thus surface defects may be easily detected based on only a measured degree of the strength of leakage magnetic flux.

With reference to FIGS. 4 and 5, the strength of leakage magnetic flux according to the positions of defects of a steel plate S will now be described in detail for the case in which magnetic flux is generated in a direction (thickness direction) perpendicular to the plane of the steel plate S.

FIG. 4 is a view illustrating the positions of defects measured in the thickness direction of a steel plate S by the surface defect detection unit 220 illustrated in FIG. 2, and FIG. 5 is a views illustrating the strength of magnetic flux with respect to the positions of the defects illustrated in FIG. 4. In FIG. 5, the horizontal axis refers to a leakage magnetic flux measurement region, and the vertical axis refers to the strength of leakage magnetic flux.

In FIG. 4, the positions of defects are illustrated in the thickness direction (T) of the steel plate S. A defect DF1 (311) existing on an upper surface of the steel plate S, a defect DF3 (322) existing in a middle position of the steel plate S, a defect DF5 (312) existing on a lower surface of the steel plate S, a defect DF2 (321) existing between the defects DF1 and DF3, and a defect DF4 (323) existing between the defects DF3 and DF5 are illustrated. According to the exemplary embodiment of the present disclosure, the second magnetizing units 221 and 223 may generate magnetic flux B in the thickness direction T of the steel plate S which is perpendicular to the surfaces of the steel plate S.

In this case, as illustrated (a) in FIG. 5 in which degrees of strength of leakage magnetic flux measured by the upper leakage magnetic flux measurement unit 222 are shown, the strength of leakage magnetic flux caused by the defect DF1 (311) existing on the upper surface of the steel plate S (refer to a curve 310) is much greater than the strength of leakage magnetic flux caused by any of the other defects DF2 to DF5 (refer to curves 321, 322, 323, and 312).

Similarly, as illustrated in (b) FIG. 5, in which degrees of strength of leakage magnetic flux measured by the lower leakage magnetic flux measurement unit 224 are shown, the strength of leakage magnetic flux caused by the defect DF5 (312) existing on the lower surface of the steel plate S (refer to a curve 312) is much greater than the strength of leakage magnetic flux caused by any of the other defects DF1 to DF4 (refer to curves 311, 321, 322, and 323).

As described above, according to the exemplary embodiment of the present disclosure, magnetic flux is generated in the thickness direction T of the steel plate S which is perpendicular to the steel plate S, and thus surface defects may be easily detected based on only measured degrees of the strength of leakage magnetic flux.

The second defect detection unit 225 of the surface defect detection unit 220 may detect surface defects of the steel plate S based on measured degrees of the strength of leakage magnetic flux.

That is, if the strength of measured leakage magnetic flux is greater than a certain value, the second defect detection unit 225 may determine that the steel plate S has a surface defect.

In addition, the second defect detection unit 225 may provide second defect data about the positions of surface defects in a detection region.

That is, as shown in FIG. 6, the second defect detection unit 225 may generate second defect data about the positions of surface defects SDF in a detection region 520 and may transmit the second defect data to the data processing unit 230. In the second defect data, points of the detection region 520 at which surface defects SDF are present may be expressed using a binary number "1," and points of the detection region 510 at which the surface defects SDF are not present may be expressed using a binary number "0."

The data processing unit 230 may detect only internal defects from a detection region by subtracting surface defects detected by the surface defect detection unit 220 from overall defects detected by the overall defect detection unit 210.

In detail, as shown in FIG. 6, the data processing unit 230 may detect only internal defects from a detection region 540 by subtracting second defect data about the detection region 520 received from the second defect detection unit 225 from first defect data about the detection region 510 received from the first defect detection unit 213 by using a subtractor 530.

In FIG. 6, although different reference numerals 510, and 520, and 540 are used, the numerical references 510, 520, and 540 refer to the same detection region on a surface of the steel plate S.

For example, each of the first leakage magnetic flux measurement unit 212 and the second leakage magnetic flux measurement units 222 and 224 may be a differential magnetic sensor array including: a first magnetic sensor array having a plurality of magnetic sensors arranged in the width direction of a steel plate S so as to measure the strength of leakage magnetic flux; a second magnetic sensor array having a plurality of magnetic sensors separate from the first magnet sensor array by a predetermined distance in a direction of transfer of the steel plate S so as to measure the strength of leakage magnetic flux; and a differential amplifier amplifying the difference between the strength of leakage magnetic flux measured by the first magnetic sensor array and the strength of leakage magnetic flux measured by the second magnetic sensor array.

As described above, since each of the first leakage magnetic flux measurement unit 212 and the second leakage magnetic flux measurement units 222 and 224 is a differential magnetic sensor array, eddy current errors occurring when a steel plate S is moved in a direction of transfer may be compensated for, and thus a non-distorted degree of the strength of leakage magnetic flux may be measured.

In addition, the first leakage magnetic flux measurement unit 212 and the second leakage magnetic flux measurement units 222 and 224 may include at least one selected from a Hall sensor, a magneto resistive (MR) sensor, a giant magneto resistive (GMR) sensor, and a giant magneto impedance (GMI) sensor.

As described above, according to the exemplary embodiment of the present disclosure, overall defects including surface defects and internal defects are first detected from a predetermined detection region of a steel plate, and then the surface defects are independently detected from the detection region of the steel plate. Therefore, only the internal defects existing in the detection region may be detected by subtracting the independently detected surface defects from the overall defects.

FIG. 7 is a flowchart illustrating a method for detecting internal defects of a steel plate according to an exemplary embodiment of the present disclosure.

Hereinafter, the method for detecting defects of a steel plate will be described in detail with reference to FIGS. 1 to 7 according to the exemplary embodiment of the present disclosure. However, the same descriptions as those given above with reference to FIGS. 1 to 6 will not be repeated here for clarity.

Referring to FIGS. 1 to 7, the overall defect detection unit 210 may detect overall defects including surface defects of a steel plate S and internal defects of the steel plate S based on the strength of leakage magnetic flux measured by generating magnetic flux in a direction of transfer of the steel plate S (S601).

In detail, the first magnetizing unit 211 of the overall defect detection unit 210 may generate magnetic flux B in the direction of transfer of the steel plate S as shown in FIG. 3.

When the magnetic flux B generated in the direction of transfer of the steel plate S passes through the steel plate S, the first leakage magnetic flux measurement unit 212 of the overall defect detection unit 210 may measure the strength of leakage magnetic flux.

Then, the first defect detection unit 213 of the overall defect detection unit 210 may detect overall defects including surface defects such as a surface defect 310 and internal defects such as an internal defect 320 based on the strength of measured leakage magnetic flux 300.

Thereafter, the surface defect detection unit 220 may detect the surface defects of the steel plate S based on the strength of leakage magnetic flux measured by generating magnetic flux in the thickness direction of the steel plate S through a detection region in which the overall defects detected by the overall defect detection unit 210 are located (S602).

In detail, the second magnetizing units 221 and 223 of the surface defect detection unit 220 may generate magnetic flux B in the thickness direction of the steel plate S as shown in FIG. 4. As described above, the second magnetizing units 221 and 223 may include: the upper magnetizing unit 221 disposed above the steel plate S to generate magnetic flux in the thickness direction of the steel plate S; and the lower magnetizing unit 223 disposed below the steel plate S to generate magnetic flux in the thickness direction of the steel plate S.

When the magnetic flux B generated in the thickness direction of the steel plate S passes through the steel plate S, the second leakage magnetic flux measurement units 222 and 224 of the surface defect detection unit 220 may measure the strength of leakage magnetic flux. As described above, the second leakage magnetic flux measurement units 222 and 224 may include: the upper leakage magnetic flux measurement unit 222 configured to measure the strength of leakage magnetic flux when magnetic flux generated by the upper magnetizing unit 221 passes through the steel plate S; and the lower leakage magnetic flux measurement unit 224 configured to measure the strength of leakage magnetic flux when magnetic flux generated by the lower magnetizing unit 223 passes through the steel plate S.

Then, the second defect detection unit 225 of the surface defect detection unit 220 may detect the surface defects of the steel plate S based on measured degrees of the strength of leakage magnetic flux.

Finally, the data processing unit 230 may detect only the internal defects existing in the detection region by subtracting the surface defects detected by the surface defect detection unit 220 from the overall defects detected by the overall defect detection unit 210 (S603).

In detail, as shown in FIG. 6, the data processing unit 230 may detect only internal defects from a detection region 540 by subtracting second defect data about a detection region 520 received from the second defect detection unit 225 from first defect data about a detection region 510 received from the first defect detection unit 213 by using the subtractor 530.

As described above, according to the exemplary embodiment of the present disclosure, overall defects including surface defects and internal defects are first detected from a predetermined detection region of a steel plate, and the surface defects are independently detected from the detection region of the steel plate. Therefore, only the internal defects existing in the detection region may be detected by subtracting the independently detected surface defects from the overall defects.

The scope of the present invention is not limited to the above-described exemplary embodiments and the accompanying drawings. The scope of the present invention is defined by the appended claims, and it will be apparent to those of ordinary skill in the art that substitutions, modifications, and variations could be made without departing from the scope of the present invention as defined by the appended claims.

The invention claimed is:

1. An apparatus for detecting internal defects of a steel plate, the apparatus comprising:
an overall defect detection unit configured to convert a degree of strength of leakage magnetic flux in a direction of transfer of the steel plate into an electrical signal, and to detect overall defects in a detection region of the steel plate including surface defects existing on a surface of the steel plate and internal defects existing inside the steel plate based on the converted electrical signal;
a surface defect detection unit detecting the surface defects in the detection region; and
a data processing unit detecting only the internal defects existing in the detection region by subtracting the surface defects detected by the surface defect detection unit from the overall defects detected by the overall defect detection unit;

wherein the surface defect detection unit comprises:

a magnetizing unit generating a main magnetic flux in a thickness direction of the steel plate;

a first surface leakage magnetic flux measurement unit measuring a main degree of strength of leakage magnetic flux when the magnetic flux generated in the thickness direction passes through the steel plate; and a first surface defect detection unit detecting the surface defects of the steel plate based on the measured degree of strength of the leakage magnetic flux when the magnetic flux generated in the thickness direction passes through the steel plate;

wherein a magnetic pole of the magnetizing unit is arranged perpendicular to the steel plate; and the first surface leakage magnetic flux measurement unit is disposed on the surface of the steel plate between the magnetic pole of the magnetizing unit and the steel plate;

wherein the magnetizing unit comprises:

an upper magnetizing unit disposed above the steel plate to generate a first magnetic flux in the thickness direction of the steel plate, and a lower magnetizing unit disposed below the steel plate to generate a second magnetic flux in the thickness direction of the steel plate, wherein the main magnetic flux comprises the first and the second magnetic fluxes;

wherein the overall defect detection unit comprises:

a first magnetizing unit to generate magnetic flux in the direction of transfer of the steel plate;

a first leakage magnetic flux measurement unit to measure the degree of strength of the leakage magnetic flux when the magnetic flux generated in the direction of transfer passes through the steel plate; and a first overall defect detection unit to detect the overall defects based on the measured degree of strength of the leakage magnetic flux when the magnetic flux generated in the direction of transfer pass through the steel plate;

wherein the first overall defect detection unit provides first overall defect data about positions of the overall defects detected in the detection region, the first surface defect detection unit provides first surface defect data about positions of the surface defects detected in the detection region, and the data processing unit detects only the internal defects existing in the detection region by subtracting the first surface defect data from the first overall defect data;

wherein the first overall defect detection unit provides the first overall defect data which expresses points of the detection region at which the overall defects are present by using a binary number "1," and points of the detection region at which the overall defects are not present by using a binary number "0," and the first surface defect detection unit provides the first surface defect data which expresses points of the detection region at which the surface defects are present by using a binary number "1," and points of the detection region at which the surface defects are not present by using a binary number "0";

wherein each of the first leakage magnetic flux measurement unit of the overall defect detection unit and the first surface leakage magnetic flux measurement unit of the surface defect detection unit comprises:

a first magnetic sensor array comprising a plurality of magnetic sensors arranged in a width direction of the steel plate so as to measure the respective degree of strength of leakage magnetic flux;

a second magnetic sensor array comprising a plurality of magnetic sensors separate from the first magnetic sensor array by a predetermined distance in the direction of transfer of the steel plate so as to measure the respective degree of strength of leakage magnetic flux; and a differential amplifier amplifying a difference between the respective degree of strength of leakage magnetic flux measured by the first magnetic sensor array and the respective degree of strength of leakage magnetic flux measured by the second magnetic sensor array and preventing distortion of the respective measured leakage magnetic flux by canceling an eddy current generated in the steel plate.

2. The apparatus of claim 1, wherein the first surface leakage magnetic flux measurement unit comprises:

an upper leakage magnetic flux measurement unit to measure a degree of strength of leakage magnetic flux when the first magnetic flux generated by the upper magnetizing unit passes through the steel plate; and a lower leakage magnetic flux measurement unit to measure a degree of strength of leakage magnetic flux when the second magnetic flux generated by the lower magnetizing unit passes through the steel plate;

wherein the main degree of strength of leakage magnetic flux comprises the measured degree of strength of leakage magnetic flux from the upper and the lower leakage magnetic flux measurement units.

3. The apparatus of claim 1, wherein each of the first leakage magnetic flux measurement unit of the overall defect detection unit and the first surface leakage magnetic flux measurement unit of the surface defect detection unit comprise at least one selected from the group consisting of a Hall sensor, a magneto resistive (MR) sensor, a giant magneto resistive (GMR) sensor, and a giant magneto impedance (GMI) sensor.

4. A method for detecting internal defects of a steel plate, the method comprising:

detecting overall defects of the steel plate including surface defects existing on a surface of the steel plate and the internal defects existing inside the steel plate by using an overall defect detection unit which converts a degree of strength of leakage magnetic flux in a direction of transfer of the steel plate into an electrical signal;

detecting the surface defects by using a surface defect detection unit in a detection region in which the overall defects detected by the overall defect detection unit are located; and detecting only the internal defects existing in the detection region by using a data processing unit by subtracting the surface defects detected by the surface defect detection unit from the overall defects detected by the overall defect detection unit;

wherein the step of detecting the surface defects by using the surface defect detection unit comprises:

generating a main magnetic flux in a thickness direction of the steel plate by using a magnetizing unit;

measuring a main degree of strength of leakage magnetic flux by using a first leakage magnetic flux measurement unit when the main magnetic flux generated in the thickness direction passes through the steel plate; and detecting the surface defects of the steel plate by using a first surface defect detection unit based on the measured degree of strength of the leakage magnetic flux when the main magnetic flux generated in the thickness direction passes through the steel plate;
wherein a magnetic pole of the magnetizing unit is arranged perpendicular to the steel plate; and
the leakage magnetic flux measurement unit is disposed on the surface of the steel plate between the magnetic pole of the magnetizing unit and the steel plate;
wherein the generating of the main magnetic flux in the thickness direction of the steel plate comprises:
generating a first magnetic flux in the thickness direction of the steel plate by using an upper magnetizing unit of the magnetizing unit; and
generating a second magnetic flux in the thickness direction of the steel plate by using a lower magnetizing unit of the magnetizing unit,
wherein the main magnetic flux comprises the first magnetic flux and the second magnetic flux;
wherein the upper magnetizing unit is disposed above the steel plate; and
the lower magnetizing unit is disposed below the steel plate;
wherein an upper leakage magnetic flux measurement unit of the first leakage magnetic flux measurement unit is disposed between the upper magnetizing unit and the steel plate; and
a lower leakage magnetic flux measurement unit of the first leakage magnetic flux measurement unit is disposed between the lower magnetizing unit and the steel plate
wherein the step of detecting of the overall defects by using the overall defect detection unit comprises:
generating the magnetic flux in the direction of transfer of the steel plate by using a first magnetizing unit;
measuring the degree of strength of the leakage magnetic flux by using a first leakage magnetic flux measurement unit when the magnetic flux generated in the direction of transfer passes through the steel plate;
detecting the overall defects by using a first overall defect detection unit based on the measured degree of strength of leakage magnetic flux when the magnetic flux generated in the direction of transfer pass through the steel plate;
providing first overall defect data regarding positions of the overall defects detected in the detection region by using the first overall defect detection unit; and
providing first surface defect data about positions of the surface defects detected in the detection region by using the first surface defect detection unit;
wherein the step of detecting of only the internal defects existing in the detection region is performed by subtracting the first surface defect data from the first overall defect data using the data processing unit;
wherein providing the first overall defect data which expresses points of the detection region at which the overall defects are present by using a binary number "1," and points of the detection region at which the overall defects are not present by using a binary number "0," and providing the first surface defect data which expresses points of the detection region at which the surface defects are present by using a binary number "1," and points of the detection region at which the surface defects are not present by using a binary number "0";
wherein measuring the respective degree of strength of leakage magnetic flux from the respective first leakage magnetic flux measuring unit of the overall defect detection unit and the surface defect detection unit includes
using a first magnetic sensor array comprising a plurality of magnetic sensors arranged in a width direction of the steel plate of each of the first leakage magnetic flux measurement unit of the overall defect detection unit and the first surface leakage magnetic flux measurement unit of the surface defect detection unit;
using a second magnetic sensor array comprising a plurality of magnetic sensors separate from the first magnetic sensor array by a predetermined distance in the direction of transfer of the steel plate of each of the first leakage magnetic flux measurement unit of the overall defect detection unit and the first surface leakage magnetic flux measurement unit of the surface defect detection unit; and
amplifying a difference between the respective degree of strength of leakage magnetic flux measured by the first magnetic sensor array and the respective degree of strength of leakage magnetic flux measured by the second magnetic sensor array, and preventing distortion of the respective measured leakage magnetic flux by canceling an eddy current generated in the steel plate, by using a differential amplifier of each of the first leakage magnetic flux measurement unit of the overall defect detection unit and the first surface leakage magnetic flux measurement unit of the surface defect detection unit.

5. The method of claim 4,
wherein the measuring of the degree of strength of leakage magnetic flux by using the leakage magnetic flux measurement unit of the surface defect detection unit comprises:
measuring a degree of strength of leakage magnetic flux by using an upper leakage magnetic flux measurement unit of the first leakage magnetic flux measurement unit of the surface defect detection unit; and
measuring a degree of strength of leakage magnetic flux by using a lower leakage magnetic flux measurement unit of the leakage magnetic flux measurement unit of the surface defect detection unit when the magnetic flux generated by the lower magnetizing unit passes through the steel plate;
wherein the main degree of strength of leakage magnetic flux comprises the measured degree of strength of leakage magnetic flux from the upper leakage magnetic flux measurement unit and the lower leakage magnetic flux measurement unit.

* * * * *